United States Patent
Madera et al.

(10) Patent No.: US 9,858,420 B2
(45) Date of Patent: Jan. 2, 2018

(54) TRANSMISSION OF TRUSTWORTHY DATA

(71) Applicant: International Business Machines Corporation, Armonk, NY (US)

(72) Inventors: Cedrine Madera, le Flamboyant (FR); Alain Maneville, Toulouse (FR)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 14/810,568

(22) Filed: Jul. 28, 2015

(65) Prior Publication Data

US 2017/0032124 A1    Feb. 2, 2017

(51) Int. Cl.
*G06F 7/04* (2006.01)
*G06F 17/30* (2006.01)
*G06F 21/57* (2013.01)

(52) U.S. Cl.
CPC ........ *G06F 21/57* (2013.01); *G06F 17/30356* (2013.01)

(58) Field of Classification Search
CPC ........... G06F 17/30309; H04L 27/2613; H04L 27/2657; H04L 27/2662
USPC .................. 707/E17.005, 638, 640, 999.203; 715/227, 229; 726/26
See application file for complete search history.

(56) References Cited

U.S. PATENT DOCUMENTS

| | | | |
|---|---|---|---|
| 7,480,860 B2 * | 1/2009 | White | G06F 17/2264 707/999.104 |
| 7,899,757 B1 | 3/2011 | Talan et al. | |
| 8,108,410 B2 | 1/2012 | Strosaker et al. | |

(Continued)

OTHER PUBLICATIONS

Dai et al., An Approach to Evaluate Data Trustworthiness Based on Data Provenance, Aug. 2008, SDM '08: Proceedings of the 5th VLDB workshop on Secure Data Management, Publisher: Springer-Verlag, pp. 82-98.

(Continued)

*Primary Examiner* — Gary Garcia
(74) *Attorney, Agent, or Firm* — Schmeiser, Olsen & Watts, LLP; Isaac Gooshaw

(57) ABSTRACT

A method and system for transmitting trustworthy data. A data file ($F_0$) of raw data including content is received. Changes to the content of the data file $F_0$ are tracked. The changes produce n changed versions of the data file ($n \geq 1$). Changed version j of the data file is denoted as $F_j$ for each positive integer j between 1 and n inclusive. Content that was changed in each version $F_1, \ldots, F_n$ of the data file is determined. A trust index $TX_n$ associated with the changed version $F_n$ of the data file is calculated, based on a cumulative number of changes between successive versions $F_0, F_1, \ldots, F_n$ of the data file. In response to a request received from a computing device for the data file $F_n$, the data file $F_n$ and the tust index $TX_n$ are transmitted to the computing device.

3 Claims, 6 Drawing Sheets

(56) References Cited

U.S. PATENT DOCUMENTS

| | | |
|---|---|---|
| 8,276,157 B2 | 9/2012 | Kache et al. |
| 8,458,194 B1* | 6/2013 | Procopio ............ G06F 17/30705 |
| | | 707/749 |
| 8,577,993 B2 | 11/2013 | Gao et al. |
| 8,825,577 B2 | 9/2014 | Fokoue et al. |
| 2003/0061245 A1* | 3/2003 | Soria, Jr. ............ G06F 17/30309 |
| 2004/0015569 A1* | 1/2004 | Lonnfors ................ H04L 29/06 |
| | | 709/220 |
| 2004/0255247 A1* | 12/2004 | Demsky ................... H04L 67/38 |
| | | 715/234 |
| 2005/0144186 A1* | 6/2005 | Hesselink ............... H04L 67/06 |
| 2008/0059630 A1* | 3/2008 | Sattler ................. G06F 9/44505 |
| | | 709/224 |
| 2008/0195677 A1* | 8/2008 | Sudhakar ............. G06F 17/3023 |
| 2010/0082580 A1* | 4/2010 | DeFrang ............. G06F 17/2288 |
| | | 707/706 |
| 2010/0106558 A1 | 4/2010 | Li et al. |
| 2011/0099256 A1* | 4/2011 | Pace ........................ G06F 8/60 |
| | | 709/221 |
| 2011/0107320 A1* | 5/2011 | Flisakowski ...... G06F 17/30256 |
| | | 717/170 |
| 2011/0295844 A1* | 12/2011 | Sun ................... G06F 17/30864 |
| | | 707/723 |
| 2013/0031056 A1* | 1/2013 | Srivastava ........ G06F 17/30215 |
| | | 707/638 |
| 2013/0080197 A1 | 3/2013 | Kung et al. |
| 2013/0133034 A1 | 5/2013 | Strietzel et al. |
| 2014/0007068 A1* | 1/2014 | Cullen ...................... G06F 8/65 |
| | | 717/169 |
| 2014/0101526 A1* | 4/2014 | Marsh ................. G06F 17/2288 |
| | | 715/229 |
| 2014/0143649 A1* | 5/2014 | Bridgen ............ G06F 17/30902 |
| | | 715/234 |
| 2014/0215575 A1 | 7/2014 | Hoyos et al. |
| 2014/0280204 A1* | 9/2014 | Avery ............... G06F 17/30424 |
| | | 707/748 |
| 2014/0281872 A1* | 9/2014 | Glover ................ G06F 17/2211 |
| | | 715/229 |
| 2015/0193435 A1* | 7/2015 | Siddhartha .......... G06F 17/2288 |
| | | 707/756 |

OTHER PUBLICATIONS

Paxata, The Missing V in Big Data—Data Veracity, <URL:http://www.paxata.com/missing-v-data-veracity, 2 pages.

Nadkarni et al., Worldwide Big Data Technology and Services, 2014-2018 Forecast, IDC, Sep. 2014, IDC #250458, 31 pages.

\* cited by examiner

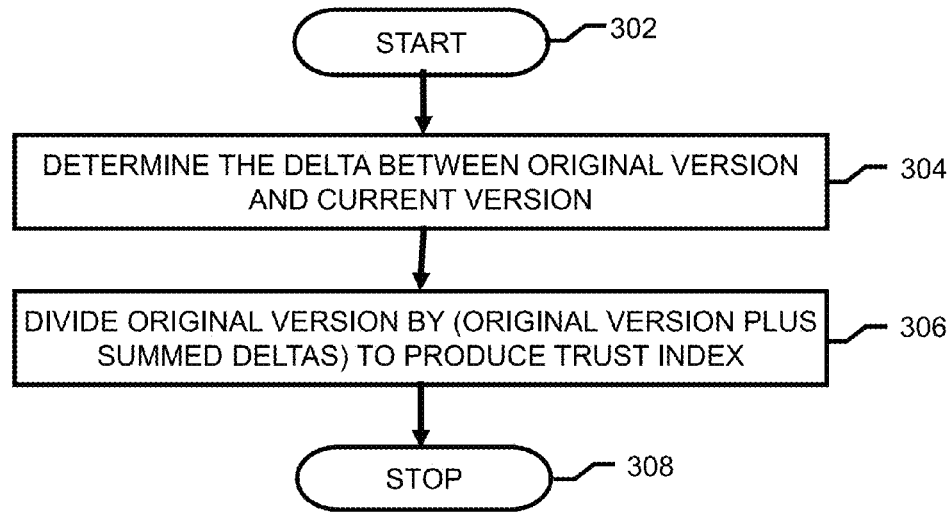

FIG. 3

| first_name | last_name | e-mail | mobile_phone | company | location |
|---|---|---|---|---|---|
| Paddy | Smith | ps@abc.com | 555-123-4567 | Wal-Mart | Bentonville, AR |
| Brian | Johnson | bj@def.com | 555-456-7890 | ExxonMobil | Irving, TX |
| Mark | Williams | mw@abc.com | 555-123-8901 | Wal-Mart | York, PA |
| Mary | Brown | mb@ghi.com | 555-789-1234 | Chevron | San Ramon, CA |
| David | Jones | dj@ghi.com | 555-789-5678 | Chevron | San Ramon, CA |
| Joey | Miller | jm@def.com | 555-456-1234 | ExxonMobil | Irving, TX |
| Sondra | Davis | sd@abc.com | 555-123-2345 | Wal-Mart | Lancaster, CA |

FIG. 4

| first_name | last_name | e-mail | mobile_phone | company | location |
|---|---|---|---|---|---|
| Paddy | Smith | ps@xyz.com | 555-234-4567 | Wal-Mart | Bentonville, AR |
| Brian | Johnson | bj@def.com | 555-456-7890 | ExxonMobil | Irving, TX |
| Mark | Williams | mw@xyz.com | 555-234-8901 | Wal-Mart | York, PA |
| Mary | Brown | mb@ghi.com | 555-789-1234 | Chevron | San Ramon, CA |
| David | Jones | dj@ghi.com | 555-789-5678 | Chevron | San Ramon, CA |
| Joey | Miller | jm@def.com | 555-456-1234 | ExxonMobil | Irving, TX |
| Sondra | Davis | sd@xyz.com | 555-234-2345 | Wal-Mart | Lancaster, CA |

FIG. 5

| first_name | last_name | e-mail | mobile_phone | company | location |
|---|---|---|---|---|---|
| Paddy | Smith | ps@xyz.com | 555-234-4567 | Wal-Mart | Bentonville, AR |
| Brian | Johnson | bj@def.com | 555-456-7890 | ExxonMobil | Irving, TX |
| Mark | Williams | mw@xyz.com | 555-234-8901 | Wal-Mart | Bentonville, AR |
| Mary | Brown | mb@ghi.com | 555-789-1234 | Chevron | San Ramon, CA |
| David | Jones | dj@ghi.com | 555-789-5678 | Chevron | San Ramon, CA |
| Joey | Miller | jm@def.com | 555-456-2345 | ExxonMobil | Irving, TX |
| Sondra | Davis | sd@xyz.com | 555-234-2345 | Wal-Mart | Lancaster, CA |

FIG. 6

TRANSMISSION OF TRUSTWORTHY DATA

TECHNICAL FIELD

The present invention relates to veracity of information, and more specifically to transmitting trustworthy data having an associated trust index indicating a veracity of the data that is to be transmitted.

BACKGROUND

In order to ensure that data can be trusted, data quality needs to be controlled, and in particular the extent of modifications to raw data needs to be known.

Prior art tools, such as Extract, Transform and Load (ETL) tools, extract data from homogeneous or heterogeneous data sources, and transform the data for storing the data in proper format or structure for querying and analysis purpose and for loading the data into a final target such as a database. Examples of such prior art ETL tools include Ab Initio®, IBM® InfoSphere® DataStage®, Informatica®, Oracle® Data Integrator and SAP® Data Integrator. Such prior art tools try to increase a level of data quality by putting in place controls, such as functional (semantic) controls and technical controls.

SUMMARY

The present invention provides a method, and associated system and computer program product, for transmitting trustworthy data. A data file ($F_0$) of raw data comprising content is received by a processor of a computer system. $F_0$ is a version zero of the data file. Changes to the content of the data file $F_0$ are tracked by the processor. The changes produce n changed versions of the data file ($n \geq 1$). Changed version j of the data file is denoted as $F_j$ for each positive integer j between 1 and n inclusive. The processor determines content that was changed in each version $F_1, \ldots, F_n$ of the data file. The processor calculates a trust index $TX_n$ associated with the changed version $F_n$ of the data file, based on a cumulative number of changes between successive versions $F_0, F_1, \ldots, F_n$, of the data file. In response to a request received from a computing device for the data file $F_n$, the processor transmits the data file $F_n$ and the trust index $TX_n$ to the computing device.

BRIEF DESCRIPTION OF THE DRAWINGS

FIG. 3 shows a flow chart of a trust index updating step of FIG. 1, in accordance with embodiments of the present invention.

FIG. 4 shows a subsequent version one of the database file of FIG. 2 containing changes, in accordance with embodiments of the present invention.

FIG. 5 shows a subsequent version two of the database file of FIG. 2 containing further changes, in accordance with embodiments of the present invention.

FIG. 6 shows a subsequent version three of the database file of FIG. 2 containing yet further changes, in accordance with embodiments of the present invention.

DETAILED DESCRIPTION

Prior art tools, such as Extract, Transform and Load (ETL) tools, try to increase a level of data quality by putting in place controls, such as functional (semantic) controls and technical controls, but these controls are insufficient to increase a level of data quality. What is missing from the prior art tools is knowledge of whether the data being used is really raw data or whether, and to what extent, the data being used has already been modified.

Figures 1, 2:
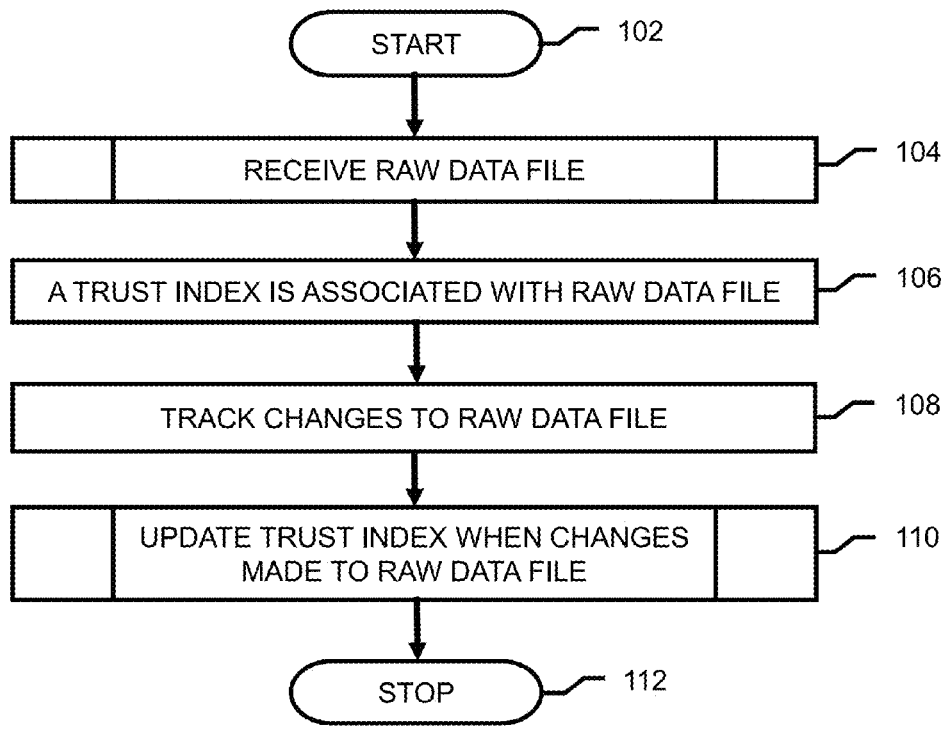
FIG. 1 shows a flow chart of a computer-implemented method of calculating a trust index associated with data in a database file, in accordance with embodiments of the present invention.
FIG. 2 shows an initial database file, which is version zero of the database file, containing raw data, in accordance with embodiments of the present invention.

FIG. 1 shows a flow chart of a computer-implemented method of calculating a trust index associated with data in a database file, in accordance with embodiments of the present invention. A trust index is associated with data, such as a database or a file. In one embodiment, the trust index may be used to populate a Veracity Key Performance Indicator (KPI) thus providing an end user of the information with a measure of trust that can be placed in the information, which provides an advantage over prior art tools that typically indicate only an intuitive measurement of the trust to be placed in the information, rather than a specific measurement.

"Big data" is a broad term for data sets so large or complex that traditional data processing applications are inadequate. Big data can be broken down into four dimensions: Volume, Variety, Velocity and Veracity.

Volume denotes a quantity of data that is generated. As of 2012, two point five trillion gigabytes of data were created globally each day.

Variety denotes a variety of different forms of data. In 2011, the global size of data in healthcare was estimated to be one hundred and sixty one billion gigabytes. Thirty billion pieces of content are shared on Facebook® every month. Four hundred million tweets are sent each day by about two hundred million active users. More than our billion hours of video are watched on YouTube® each month.

Velocity denotes a speed of generation of data or how fast the data is generated and processed. By 2016, it is projected that there will be eighteen point nine billion network connections or almost two and a half network connections per person on earth. The New York Stock Exchange captures one thousand gigabytes of trade information during each trading session. A modern car has close to one hundred sensors that monitor items such as fuel level and tire pressure.

Veracity denotes a quality of data, or an uncertainty associated with data, being captured, which can vary greatly. It has been found that one in three business leaders do not trust the information they use to make business decisions. Poor data quality costs the US economy around $3.1 trillion per year. Twenty seven percent of respondents in one survey were unsure of how much of the respondents' data was inaccurate.

The method of FIG. 1 starts at step 102. At step 104, a data file of raw data comprising content ($F_0$) is received by a computer system (e.g., the computer system 912 of FIG. 9).

FIG. 2 shows an initial database file, which is version zero of the database file, containing raw data, in accordance with embodiments of the present invention. The raw data file in Table 1 below is pseudocode defining a "contacts" table.

TABLE 1

```
define table contacts
(
    first_name char(20),
    last_name char(20),
    e-mail char(40),
    mobile_phone char(20),
    company char(100),
    location char(100)
);
```

The raw data file, version zero (denoted $F_0$) shown in FIG. 2, comprises seven rows or records of data and six columns or fields of data. This content of file $F_0$ (denoted as $C(F_0)$) is measured by the size of $F_0$, wherein the size of $F_0$ is the product of the number of columns and the number of rows of $F_0$ representing the initial content of the data file. The size of $F_0$ is represented by $C(F_0)$. Since the initial content of the data file $F_0$ comprises seven rows and six columns, the value of $C(F_0)$ is 42, that is seven rows multiplied by six columns. The fields of data chosen are purely exemplary and in practice and it is likely that many more fields of data would be used, particularly in "Big data" applications. The seven records are also merely exemplary and in a practical application, it is likely that many more than seven records would be present in the raw data file. The use of a "contacts" database is also merely exemplary and any database or other data file may be used.

At step 106, a trust index is initialized and associated with the raw data file $F_0$ of FIG. 2.

At step 108, changes made to the raw data file $F_0$ of FIG. 2 are tracked. The tracking of the changes is carried out, as described below with reference to FIG. 3, by the computer determining information about content that was changed each time the raw data file was copied to produce a changed version. The changes produces n changed versions of the raw data file $F_0$, wherein n is a positive integer of at least 1, and wherein changed version j of the data file is denoted as $F_j$ for each positive integer j between 1 and n inclusive.

Whenever a new version ($F_n$) of the raw data file is identified, then at step 110, the trust index ($TX_n$) is calculated. The trust index $TX_n$ associated with the changed version $F_n$ of the data file is calculated, based on a cumulative number of changes between successive versions $F_0$, $F_1$, ..., $F_n$ of the data file. The step of updating the trust index will be further described below with reference to FIG. 3. The method ends at step 112.

FIG. 3 shows a flow chart of a trust index updating step 110 of FIG. 1, in accordance with embodiments of the present invention. The trust updating step starts at step 302. At step 304, a measure of a difference (called a "delta" herein) between the original version and the current version of the raw data file received at step 104 is determined.

FIG. 4 shows a subsequent version one of the database file ($F_0$) of FIG. 2 containing changes, in accordance with embodiments of the present invention. FIG. 4 shows a version one, denoted $F_1$, of the raw data file $F_0$ of FIG. 2. The current version one is the original raw data file $F_0$ of FIG. 2 with changes made. The changes made are that Joey Miller has changed from working for Wal-Mart to working for ExxonMobil. Corresponding changes are made to Joey Miller's e-mail, mobilephone, company and location fields.

Mark Williams has moved from the Bentonville, Ark. location of Wal-Mart to the York, Pa. location, but has retained the same e-mail and mobile_phone data. Sondra Davis has changed her mobile_phone number. The content of the current version of the file $F_1$ after one set of changes has been made is referred to as $C(F_1)$. In a similar manner, when further changes are made, as will be described below, the content of the file $F_n$ after "n" changes is referred to as $C(F_n)$.

There are six changes described above for file $F_1$ in total relative to the raw data file. Thus, the value of the difference (denoted as $DELTA_1(F)$) between the cumulative number of changes made in the current version ($C(F_1)$) and the cumulative number of changes made in the previous version ($C(F_0)$ is 6. This gives a value for $DELTA_1(F)$ of 6.

At step 306, the computer calculates a trust index associated with a changed version of the data based on the cumulative number of changes between the raw data file and the changed version of the data. The trust index is calculated by summing the number of changes made between successive versions of the data, from the raw data file through each version to the changed current version of the data. The content of the original version ($C(F_0)$) is divided by the content of the current version ($C(F_1)$) to produce the Trust Index ($TX_1$). As stated above, for $C(F_0)$, the total number of elements (i.e., seven rows multiplied by six columns) is 42. The content of current version ($C(F_1)$) is equal to content of the original version ($C(F_0)$) plus the delta ($DELTA_1(F)$).

Calculation of the Trust Index ($TX_n$) for file $F_n$ (n being a positive integer of at least 1) uses the formulas:

$$TX_n = \frac{C(F_0)}{C(F_n)}$$

$$C(F_n) = C(F_0) + DELTA_n(F)$$

Thus, $$TX_n = \frac{C(F_0)}{C(F_0) + DELTA_n(F)}$$

wherein $$DELTA_n(F) = \sum_{t=1}^{n} DELTA(F_t)$$

and $DELTA(F_t)$ is the difference (i.e., number of changes) between the content of file $F_{t-1}$ and the content of file $F_t$ for $1 \le t \le n$.

Thus, for n=1, $$TX_1 = \frac{C(F_0)}{C(F_1)}$$

$$C(F_1) = C(F_0) + DELTA_1(F)$$

Therefore, $$TX_1 = \frac{C(F_0)}{C(F_0) + DELTA_1(F)}$$

$DELTA_1(F) = DELTA(F_1) = 6$. Since $C(F_0)$ is equal to 42 and $DELTA_1(F)$ is equal to 6, the Trust Index ($TX_1$) for file $F_1$ is equal to 42/(42+6)=0.875 or 87.5%. The Trust Index will always be equal to one or less. A Trust Index equal to 1 means that the original version and the current version are the same, and that no changes were made to the original version and to any other version, and the resulting data can be trusted. The more the data is copied, transformed or changed, the more differences there will be and the lower the Trust Index will be.

FIG. 5 shows a new current version two ($F_2$) of the database data file ($F_0$) of FIG. 2 containing raw data, in accordance with embodiments of the present invention. In FIG. 5, the new current version two ($F_2$) is the previous version one ($F_1$) of FIG. 4 with further changes made, namely five changes. The five changes made are that e-mail addresses and mobile phone numbers associated with Wal-Mart are changed. The e-mail address domain changes from abc.com to xyz.com and the center portion of the mobile phone numbers change from "123" to "234". Thus, there are now eleven changes in total to the original raw data file ($C(F_0)$), giving a value for $DELTA_2(F)$ of 11 (i.e., 6+5). The content of the new current version of the file after two sets of changes has been made will be referred to as $C(F_2)$.

At step 306, the trust index is calculated. Starting with the original version $C(F_0)$, changes as described above were made to produce versions one ($C(F_1)$) and two ($C(F_2)$). The ratio of the previous version file content ($C(F_0)$) to the current version ($C(F_2)$) file content is determined. The total number of elements, that is rows multiplied by columns, remains at 42. As stated supra, the formula used to calculate the cumulative delta $DELTA_n(F)$ for an $n^{th}$ change is:

$$DELTA_n(F) = \Sigma_{t=1}^{n} DELTA(F_t)$$

For example, for the version two of FIG. 5, $DELTA_2(F)$ is equal to the sum of $DELTA(F_1)$ which was 6, and $DELTA(F_2)$ which was 5, making a total of 11.

At step 306, the content of the original version ($C(F_0)$) is divided by the content of the current version ($C(F_2)$) to produce a Trust Index ($TX_2$). The content of the current version ($C(F_2)$) is equal to the content of the original version ($C(F_0)$) plus the delta ($DELTA_2(F)$). Calculation of the Trust Index ($TX_2$) uses the formula:

$$TX_2 = \frac{C(F_0)}{C(F_0) + DELTA_2(F)}$$

Since $C(F_0)$ is equal to 42 and $DELTA_2(F)$ is equal to 11, then the Trust Index ($TX_2$) is equal to 42/(42+11)=0.792 or 79.2%.

FIG. 6 shows a subsequent version three ($F_3$) of the database file of FIG. 2 containing yet further changes, in accordance with embodiments of the present invention. The changes made are that Mark Williams has moved back to the Bentonville, Ark. location of Wal-Mart from the York, Pa. location, thus returning the location information field of his data record to the value it was in the original file. Mark has retained the same e-mail and mobile_phone data. Joey Miller has changed his mobile_phone number. This means that there are 2 new changes relative to file $F_2$ and 13 changes in total relative to the original raw data file. The content of the current version ($F_3$) of the file is referred to as $C(F_3)$.

At step 306, the trust index is calculated. Starting with the original version ($F_0$), changes as described above were made to produce versions one ($F_1$), two ($F_2$) and three ($F_3$). As mentioned above, the formula used to calculate the cumulative delta for an $n^{th}$ change is:

$$DELTA_n(F) = \Sigma_{t=1}^{n} DELTA(F_t)$$

For version three ($F_3$), there are two changes relative to F2, namely Joey's mobile phone number and Mark's location. Thus, $DELTA_3(F)$ is equal to the sum of $DELTA(F_1)$ which was 6, $DELTA(F_2)$ which was 5, $DELTA(F_3)$ which was 2, making a total of 13.

The content of the original version ($C(F_0)$) is divided by t content of the he current version ($C(F_3)$) to produce a Trust Index ($TX_3$). The content of the current version ($C(F_3)$) is equal to content of the original version ($C(F_0)$) plus the delta ($DELTA_3(F)$). The Trust Index is calculated using the formula:

$$TX_3 = \frac{C(F_0)}{C(F_0) + DELTA_3(F)}$$

Since $C(F_0)$ is equal to 42 and $DELTA_3(F)$ is equal to 13, then the Trust Index (TX) is equal to 42/(42+13)=0.764 or 76.4%.

The Trust Index ($TX_n$) is a measure of the trust which can be placed on the changed data in file $F_n$. The Trust Index ($TX_n$) for each of the subsequent versions 1 to 3 (i.e., $F_1$, $F_2$, $F_3$) of FIGS. 4 to 6, respectively, are shown in the Table 2 below:

TABLE 2

| Version | Number of changes (DELTA) | R (Number of records (rows)) | C (Number of fields (columns)) | R × C | R × C (changed) | $TX_n$ |
|---|---|---|---|---|---|---|
| $F_0$ | 0 | 7 | 6 | 42 | 0 | N/A |
| $F_1$ | 6 | 7 | 6 | 42 | 6 | 87.5% |
| $F_2$ | 5 | 7 | 6 | 42 | 11 | 79.2% |
| $F_3$ | 2 | 7 | 6 | 42 | 2 | 76.4% |

Figure 7:
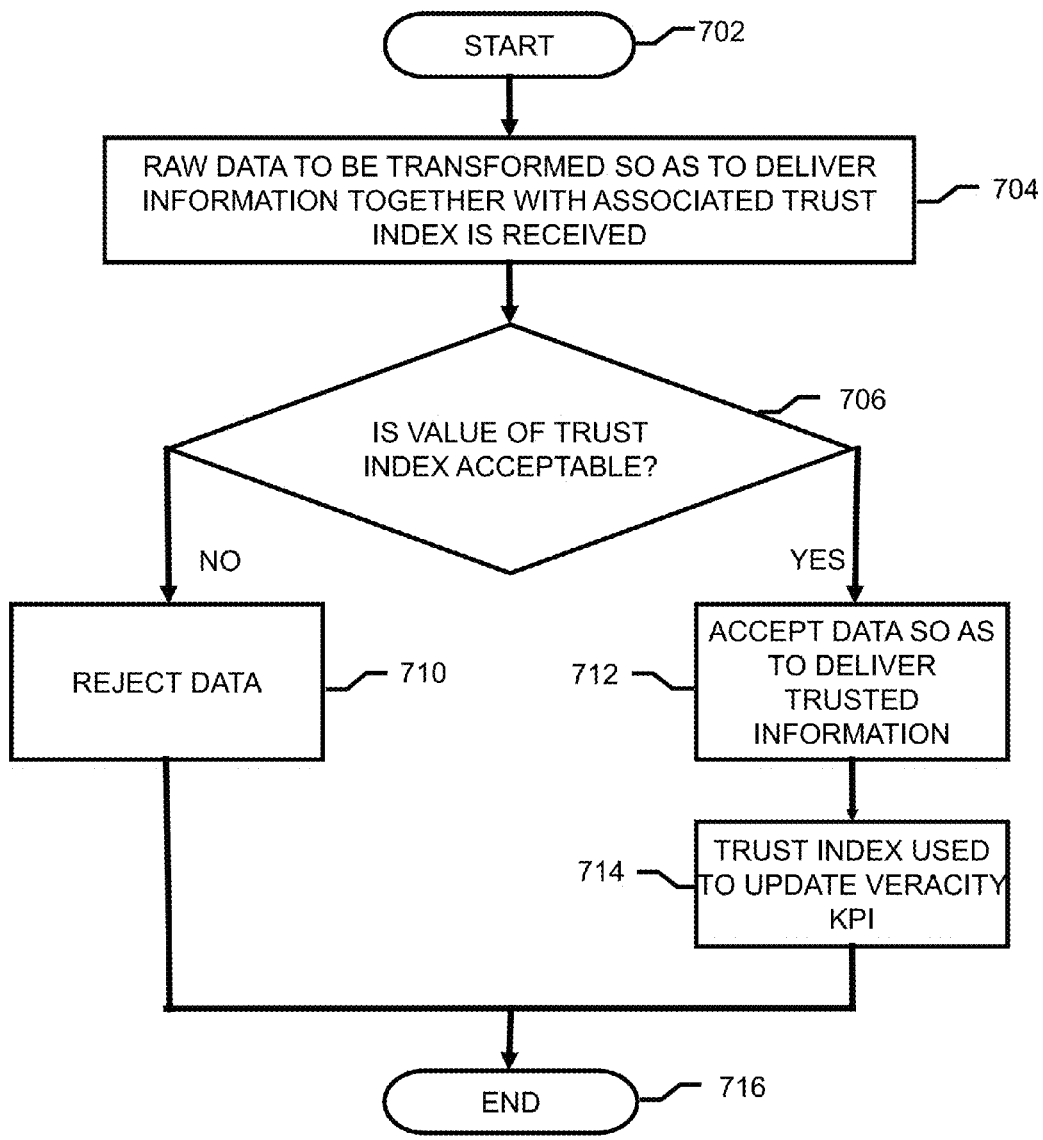
FIG. 7 shows a flow chart depicting a process of using a trust index associated with data, in accordance with embodiments of the present invention.

FIG. 7 shows a flow chart depicting a process of using a trust index associated with data, in accordance with embodiments of the present invention. In one embodiment, the data is to be used to populate a Big Data and Analytics system. The trust index is used as a Key Performance Indicator for the Veracity of changed versions of the data. The process of FIG. 7 starts at step 702.

At step 704, the raw data is received. The current version Fn of the changed raw data, together with the associated trust index $TX_n$, is to be subsequently transmitted (in step 712 discussed infra) to a requestor in response to a request from the requestor for the current version $F_n$ of the changed raw data from the computing device. The requestor requires $F_n$ for performing an operation on $F_n$ or for using $F_n$ for a particular useful purpose. The requestor may be a computing device. The requestor may be within, or external to, the computer system (e.g. computer system 912 of FIG. 9) that computes the trust index $TX_n$. In the examples of raw data above, the raw data and/or information is version zero with a 100% trust index, version one with a 87.5% trust index, version two with a 79.2% trust index, or version three with a 76.4% trust index.

At step 706, a determination is made as to whether the value of the trust index $TX_n$ is acceptable by comparing $TX_n$ with a predetermined threshold $TX_{min}$. If the trust index value is not acceptable (i.e., $TX_n < TX_{min}$), then at step 710 the data is rejected. In one embodiment, a transformation of the raw data into information may take place, but a warning that the data has an unacceptable trust index may be associated with the transformed data. The example application ends at step 716

If the trust index value is acceptable (i.e., $TX_n \geq TX_{min}$), then at step 712 the data is accepted and is used to transmit trusted information to a requestor. Specifically, the current version $F_n$ of the changed raw data and the associated trust index $TX_n$, is transmitted to the requestor who had requested the current version $F_n$ of the changed raw data. The requestor requires $F_n$ for performing an operation on $F_n$ or for using $F_n$ for a particular useful purpose. The requestor may be a computing device. The requestor may be within, or external to, the computer system that computes the trust index $TX_n$.

At step 714, the trust index is used to update the Key Performance Indicator associated with the Veracity of the data.

In one embodiment in which $TX_n < TX_{min}$ in step 706 and n>1, the trust index $TX_{n-1}$ for the previous version $F_{n-1}$ is computed and tested against the threshold $TX_{min}$ for acceptability and if $TX_{n-1}$ is acceptable (i.e., $TX_{n-1} \geq TX_{min}$) and if the previous version $F_{n-1}$ is determined to be acceptable for the intended use of the changed raw data, then steps 712 and 714 are performed for $F_{n-1}$ and $TX_{n-1}$.

The example application ends at step 716.

Figure 8:
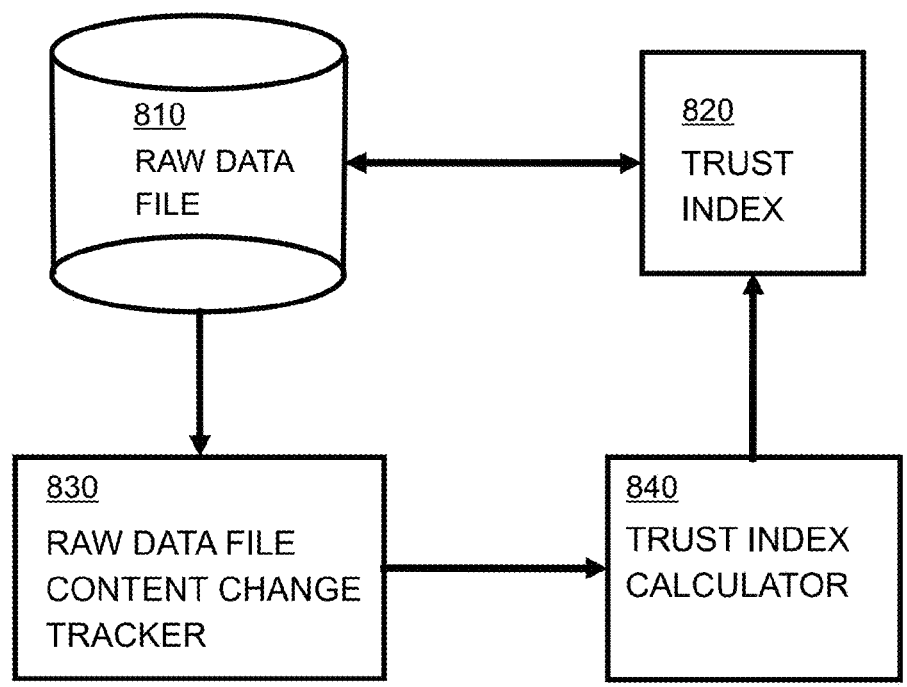
FIG. 8 shows a block diagram of an embodiment of a system for calculating a trust index associated with data, in accordance with embodiments of the present invention.

FIG. 8 shows a block diagram of an embodiment of a system for calculating a trust index associated with data, in accordance with embodiments of the present invention. A raw data file 810 is received. Raw data file content change tracker 830 determines information about content that was changed each time the raw data file 810 was copied to produce a changed version of raw data file 810. Trust index calculator 840 calculates a trust index 820 which is then associated with a changed version of the raw data file 810. Trust index calculator calculates trust index 820 based on the cumulative number of changes between the raw data file 810 and the changed version of the data.

In an embodiment, the trust index 820 is calculated by summing the number of changes made between successive versions of the data, from the raw data file 810 ($F_0$) through each version $F_t (1 \leq t \leq n)$ to the changed version ($F_n$) of the data.

In an embodiment, the trust index 820 for the changed version $F_n$ of data is calculated using the formula:

$$TX_n = \frac{C(F_0)}{C(F_0) + DELTA_n(F)}$$

wherein:
C(F0) is the total number of elements in the raw data file; and $$DELTA_n(F) = \Sigma_{t=1}^{n} DELTA(F_t)$$

$DELTA(F_t)$ is the number of elements changed between version t−1 and version t, wherein $F_0$ is the raw data file.

As described above with reference to FIG. 7, the trust index may be used as a Key Performance Indicator for the Veracity of the changed version of the raw data file.

Figure 9:
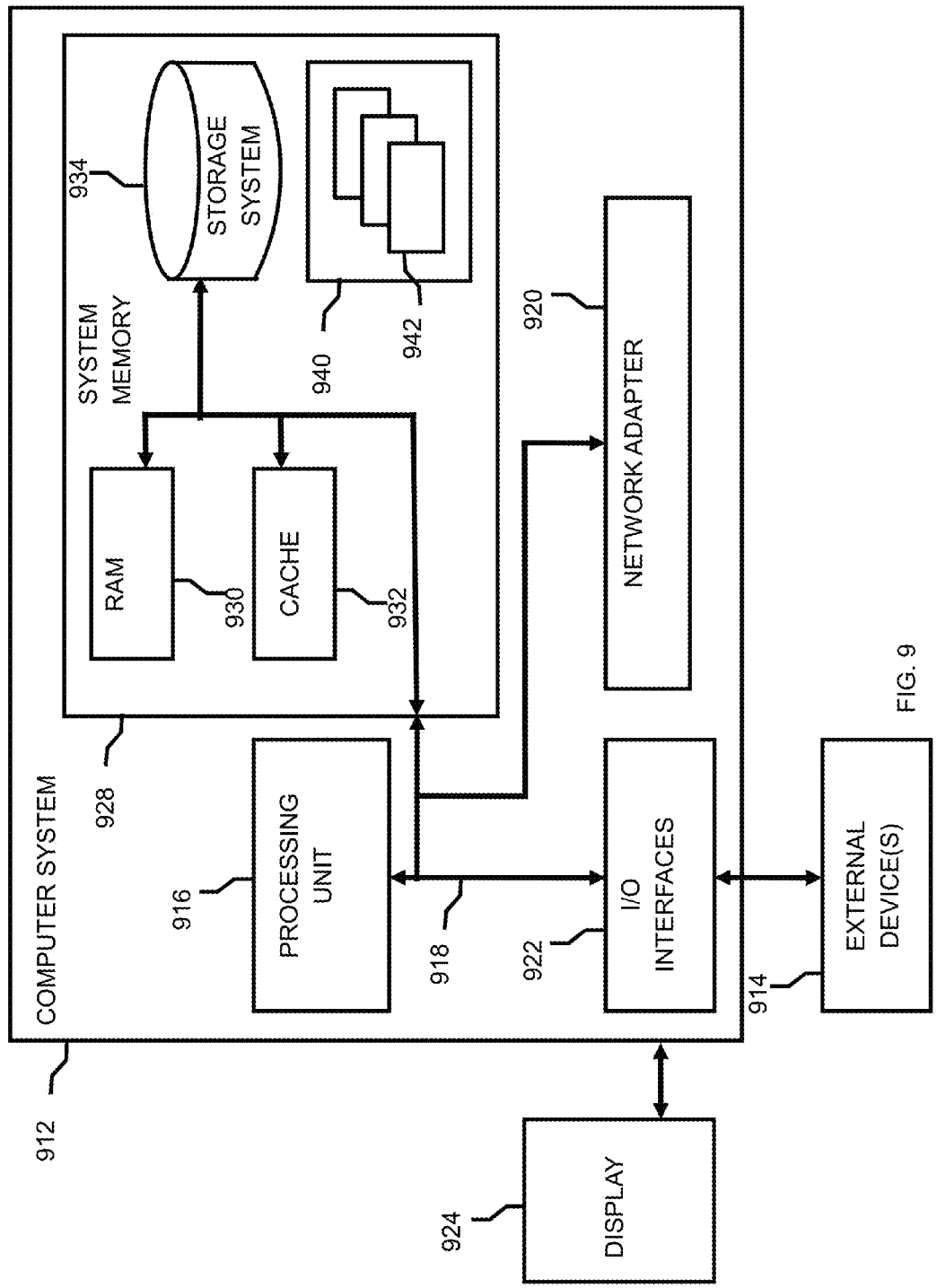
FIG. 9 shows a computer system for implementing methods of the present invention, in accordance with embodiments of the present invention.

FIG. 9 shows a computer system 912 for implementing methods of the present invention, in accordance with embodiments of the present invention. Computer system/server 912 is only one example of a suitable computer system and is not intended to suggest any limitation as to the scope of use or functionality of embodiments of the invention described herein. Regardless, computing system 912 is capable of being implemented and/or performing any of the functionality set forth hereinabove.

Computer system/server 912 is operational with numerous other general purpose or special purpose computer system environments or configurations. Examples of well-known computer systems, environments, and/or configurations that may be suitable for use with computer system/server 912 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for transmitting trustworthy data, said method comprising:
  receiving, by a processor of a computer system, a raw data file ($F_0$) of raw data comprising content, wherein $F_0$ is a version zero of the data file;
  tracking, by the processor, changes to the content of the raw data file $F_0$, the changes producing n changed versions of the data file, wherein n is a positive integer of at least 2, and wherein changed version j of the data file is denoted as $F_j$ for each positive integer j between 1 and n inclusive;
  determining, by the processor, the changes to the content within the data file in each version $F_1, \ldots, F_n$ of the data file;
  calculating, by the processor, a trust index $TX_n$ associated with the changed version $F_n$ of the data file, wherein $TX_n$ is a measure of trust which can be placed on the data in file $F_n$, and wherein said calculating $TX_n$ is based on a cumulative number of changes to the content within the data file between successive versions $F_0, F_1, \ldots, F_n$ of the data file; and
  in response to a request for $F_n$ received from a requestor associated with a computing device, said processor transmitting $F_n$ and $TX_n$ to the computing device over a communication network,
  wherein said calculating $TX_n$ is performed in accordance with the formulas of:

$$TX_n = \frac{C(F_0)}{C(F_0) + DELTA_n(F)}$$

$$DELTA_n(F) = \sum_{t=1}^{n} DELTA(F_t)$$

wherein $C(F_0)$ is a total number of elements in file $F_0$,
  wherein $DELTA(F_t)$ is a total number of elements changed between versions $F_{t-1}$ and $F_t$ of the data file for $1 \le t \le n$, and
  wherein the Trust Index $TX_n$ is used to update a Key Performance Indicator associated with a veracity of the data in the changed data file $F_n$.

2. A computer program product, comprising:
a hardware storage device having computer readable program code stored therein, said program code containing instructions executable by a processor of a computer system to implement a method for transmitting trustworthy data, said method comprising:
  receiving, by the processor, a raw data file ($F_0$) of raw data comprising content, wherein $F_0$ is a version zero of the data file;
  tracking, by the processor, changes to the content of the raw data file $F_0$, the changes producing n changed versions of the data file, wherein n is a positive integer of at least 2, and wherein changed version j of the data file is denoted as $F_j$ for each positive integer j between 1 and n inclusive;
  determining, by the processor, the changes to the content within the data file in each version $F_1, \ldots, F_n$ of the data file;
  calculating, by the processor, a trust index $TX_n$ associated with the changed version $F_n$ of the data file, wherein $TX_n$ is a measure of trust which can be placed on the data in file $F_n$, and wherein said calculating $TX_n$ is based on a cumulative number of changes to the content within the data file between successive versions $F_0, F_1, \ldots, F_n$ of the data file; and
  in response to a request for $F_n$ received from a requestor associated with a computing device, said processor transmitting $F_n$ and $TX_n$ to the computing device over a communication network,
  wherein $TX_n$ is a measure of trust which can be placed on the data in file $F_n$,
  wherein said calculating $TX_n$ is performed in accordance with the formulas of:

$$TX_n = \frac{C(F_0)}{C(F_0) + DELTA_n(F)}$$

$$DELTA_n(F) = \sum_{t=1}^{n} DELTA(F_t)$$

wherein $C(F_0)$ is a total number of elements in file $F_0$,
  wherein $DELTA(F_t)$ is a total number of elements changed between versions $F_{t-1}$ and $F_t$ of the data file for $1 \le t \le n$, and wherein the Trust Index $TX_n$ is used to update a Key Performance Indicator associated with a veracity of the data in the changed data file $F_n$.

3. A computer system, comprising: a processor, a memory, and a computer readable hardware storage device having computer readable program code stored therein, said program code executable by the processor via the memory to implement a method for transmitting trustworthy data, said method comprising:

receiving, by the processor, a raw data file ($F_0$) of raw data comprising content, wherein $F_0$ is a version zero of the data file;

tracking, by the processor, changes to the content of the raw data file $F_0$, the changes producing n changed versions of the data file, wherein n is a positive integer of at least 2, and wherein changed version j of the data file is denoted as $F_j$ for each positive integer j between 1 and n inclusive;

determining, by the processor, the changes to the content within the data file in each version $F_1, \ldots, F_n$ of the data file;

calculating, by the processor, a trust index $TX_n$ associated with the changed version $F_n$ of the data file, wherein $TX_n$ is a measure of trust which can be placed on the data in file $F_n$, and wherein said calculating $TX_n$ is based on a cumulative number of changes to the content within the data file between successive versions $F_0, F_1, \ldots, F_n$ of the data file;

in response to a request for $F_n$ received from a requestor associated with a computing device, said processor transmitting $F_n$ and $TX_n$ to the computing device over a communication network, wherein $TX_n$ is a measure of trust which can be placed on the data in file $F_n$, wherein said calculating $TX_n$ is performed in accordance with the formulas of:

$$TX_n = \frac{C(F_0)}{C(F_0) + DELTA_n(F)}$$

$$DELTA_n(F) = \sum_{t=1}^{n} DELTA(F_t)$$

wherein $C(F_0)$ is a total number of elements in file $F_0$, wherein $DELTA(F_t)$ is a total number of elements changed between versions $F_{t-1}$ and $F_t$ of the data file for $1 \leq t \leq n$, and wherein the Trust Index $TX_n$ is used to update a Key Performance Indicator associated with a veracity of the data in the changed data file $F_n$.

* * * * *